US007007980B2

(12) United States Patent
Otsuga et al.

(10) Patent No.: US 7,007,980 B2
(45) Date of Patent: Mar. 7, 2006

(54) DUCT CONNECTION ASSEMBLE BETWEEN A BRANCH DUCT AND A MAIN DUCT

(75) Inventors: Norio Otsuga, Toyama (JP); Hiroshi Enami, Niigata (JP); Kazumasa Okayama, Tokyo (JP)

(73) Assignee: Kabushiki Kaisha Sanritsu, Toyama (JP)

( * ) Notice: Subject to any disclaimer, the term of this patent is extended or adjusted under 35 U.S.C. 154(b) by 234 days.

(21) Appl. No.: 10/697,798

(22) Filed: Oct. 31, 2003

(65) Prior Publication Data

US 2004/0135367 A1 Jul. 15, 2004

Related U.S. Application Data

(63) Continuation-in-part of application No. 10/297,400, filed as application No. PCT/JP00/03742 on Jun. 8, 2000, now abandoned.

(51) Int. Cl.
*F16L 41/00* (2006.01)

(52) U.S. Cl. ...................... 285/197; 285/180; 285/199; 285/198; 285/903

(58) Field of Classification Search ................ 285/180, 285/197–199, 903, 133.11

See application file for complete search history.

(56) References Cited

FOREIGN PATENT DOCUMENTS

| | | |
|---|---|---|
| FR | 1263223 | 10/1961 |
| JP | 1-307594 A | 12/1989 |
| JP | 3-107697 | 5/1991 |
| JP | 3-121397 A | 5/1991 |
| JP | 7-119884 | 5/1995 |
| JP | 4-194489 | 9/1995 |

OTHER PUBLICATIONS

CD-ROM of the specification and drawings annexed to the request of Japanese Utility Model Application No. 35296/1992 (Laid-open no. 94597/1993), (Sekisui Chemical Co., Ltd.), Dec. 24, 1993.

*Primary Examiner*—Aaron Dunwoody
(74) *Attorney, Agent, or Firm*—Morgan Lewis & Bockius LLP

(57) ABSTRACT

A duct connection assemble, whereby upon connecting a saddle flange (2*a*) of the joint duct (8) to the main ribbed duct (3) through the communication hole (1*b*), the rubber sealant (1) is interposed between the saddle flange (2*a*) and a circumferential area of the communication hole (1*b*) so that protuberances (2*b*) uniformly press the rubber sealant (1) through the recesses (1*d*) to tightly engage the saddle flange (2*a*) against an outer surface of the main ribbed duct (3) through rib-fitting grooves (1*a*) and the water sealing small projective rings (1*c*). The joint duct (2) is brought into an elastical engagement with the main ribbed duct (3) to achieve a good water sealing action for an extended period of time.

18 Claims, 19 Drawing Sheets

DUCT CONNECTION ASSEMBLE BETWEEN A BRANCH DUCT AND A MAIN DUCT

The invention is a continuation-in-part Application derived from U.S. patent application Ser. No. 10/297,400, now abandoned, filed Jun. 23, 2003, (International Application Filing Date: Jun. 8, 2000 (PCT/JP00/03742)).

FIELD OF THE INVENTION

The invention relates to a duct connection assemble provided between a branch duct and a main duct in an improved way to prevent a water leakage seeping through therebetween.

BACKGROUND OF THE INVENTION

This type of the connection assemble is disclosed by Laid-open Japanese Patent Application No. 7-119884 by way of illustration in which a duct assemble introduces domestic waste water to run into a main ribbed duct. The main duct has an array of ribs around its securement opening. A branch duct has a saddle flange which has undulating wavy portions. Upon putting the branch duct on the main duct for connection, the undulating wavy portions interfit into the ribs of the main duct. At this time, an adhesive agent may be applied to the connection portion between the saddle flange and the main duct. The saddle flange may be tightly bound to the main duct by means of a wire band. Otherwise, the saddle flange is tightly secured to the main duct by engaging a pawl against an inner wall of the main duct.

However, both the main duct and the saddle flange are formed by a hard synthetic resin material, and the saddle flange may slide against the main duct if they are shaken when subjected to an exterior force. In addition, the adhesive agent may deteriorate to fall off the saddle flange. This would result in the water leakage at the connection between the saddle flange and the main duct. This is all the more prone to the water leakage because the adhesive agent is not per se suited to a water sealing action.

Therefore, the present invention has been made with the above drawbacks in mind, it is an object of the invention to provide a duct connection assemble which is capable of positively sealing a connection between a main duct and a saddle flange to prevent a water leakage for an extended period of time with a relatively simple structure.

SUMMARY OF THE INVENTION

According to the invention, there is provided a duct connection assemble between a branch duct and a main duct, whereby upon connecting a saddle flange of the joint duct to the main ribbed duct through the communication hole, the rubber sealant is interposed between the saddle flange and a circumferential area of the communication hole so that protuberances uniformly press the rubber sealant substantially through the recesses to tightly engage the saddle flange against an outer surface of the main ribbed duct through rib-fitting grooves and water sealing small projective rings.

In this instance, the rubber sealant elastically engages against the main ribbed duct and saddle flange to effectively absorb shaking tremor and impact so as to continuously water-tightly seal at an interface between the main ribbed duct and the saddle flange for an extended period of time. Due to the water sealing small projective rings provided on an inner side of the rubber sealant, the water sealing effect is significantly strengthened around a circumferential area of the communication hole. Due to the fact that the protuberances uniformly press the rubber sealant, the protuberances are forced into the recesses of the rubber sealant to expand the rubber sealant to elastically engage it with the main ribbed duct.

A rubber seal ring is provided to liquid-tightly seal between the saddle flange and a circumferential area of the communication hole, and the rubber seal ring is formed in one piece with the rubber sealant. Due to the rubber seal ring formed in one piece with the rubber sealant, the number of component parts is reduced to save the manufacturing cost, while at the same time, becoming facile to handle the rubber sealant to enable working staffs to quickly connecting the branch duct to the main ribbed duct.

A pawl stopper is rotationally supported on an inner wall of the branch duct in which the pawl stopper has a hook portion which engages with an inner edge of the communication hole. Due to the pawl stopper which rotates the hook portion to engage it with the inner edge of the communication hole, a connection structure between the main ribbed duct and the saddle flange is strengthened.

The rubber sealant is made of an water-expandable rubber. An elastic engagement against both the main ribbed duct and the saddle flange is strengthened to secure an effective water sealing action.

An inner surface of the recesses of the rubber sealant is tapered to progressively increases a breadth toward an outer periphery of the recesses. The tapered recesses serve as guides to readily fit the protuberances into the recesses.

A breadth of the protuberances is slightly greater than that of the recesses so that the protuberances elastically expand the recesses when fitting the protuberances into the recesses. Due to the recesses elastically expanded, an elastic engagement of the saddle flange against the main ribbed duct is all the more equalized.

The water-expandable rubber is formed by mixing an water-absorptive resin with styrene butadiene rubber (SBR) and isoprene rubber (IR), otherwise prepared by mixing an water-absorptive resin with chloroprene rubber (CR).

The rubber sealant is in the form of rectangular frame which has a rectangular communication hole at an outer peripheral area of the rubber sealant.

The rib-fitting grooves are 2 to 3 mm in breadth, and the water sealing small projective rings are 1 to 3 mm in both breadth and height.

A plurality of small ribs are formed between the ribs, the rib-fitting grooves having narrow and deep grooves fit into the ribs and grooves of small depth fit into the small grooves.

A wire band is provided to tightly bind the saddle flange to the main ribbed duct.

According to the invention, there is provided a duct connection assemble in which a branch duct is connected to a joint duct which has a saddle flange formed on a lower portion of said joint duct. A main duct has an upper opening in correspondence to the joint duct. A rubber sealant has a communication hole which is to be in communication with the upper opening of the main duct. A plastic stopper plate has substantially an L-shaped cross section and is rotationally supported on an inner wall of the branch duct. The stopper plate has a hook portion which engages through the rubber sealant with an inner edge located around the upper opening of the main duct. Upon connecting the branch duct through the joint duct and the rubber sealant to the main duct, the stopper plate is rotationally moved so that the stopper plate tightly engages the hook portion with an inner edge located around the upper opening of the main duct in accompany with an elastic deformation of the hook portion in which the hook portion elastically expands outward to strengthen an engagement against the inner edge located around the upper opening of the main duct.

According to other aspect of the invention, a right-angled triangle piece is provided on both sides of the hook portion. The right-angled triangle piece forms an acute angle against a vertical wall of the stopper plate. Upon engaging the hook portion with an inner edge located around the upper opening of the main duct, the hook portion elastically deforms to tightly engage its hypotenuse portion with the inner edge around the upper opening for positively securing it against removal.

According to other aspect of the invention, the stopper plate has a hook portion warped downward to define a curved plane. The curved plane elastically deforms to tightly engage with the inner edge located around the upper opening of the main duct at the time of connecting the branch duct to the main duct.

According to other aspect of the invention, the hook portion has a stepped portion along a breadth direction to define a slantwise plane consecutively formed from a base plane. The slantwise plane is successively elevated toward a tip end of the hook portion. At the time of connecting the branch duct to the main duct, the hook portion elastically engages the slantwise plane with the inner edge around the upper opening so as to strengthen the engagement action.

BRIEF DESCRIPTION OF THE DRAWINGS

A preferred forms of the present invention are illustrated in the accompanying drawings in which.

DETAILED DESCRIPTION OF PREFERRED EMBODIMENTS OF THE INVENTION

Figure 1:
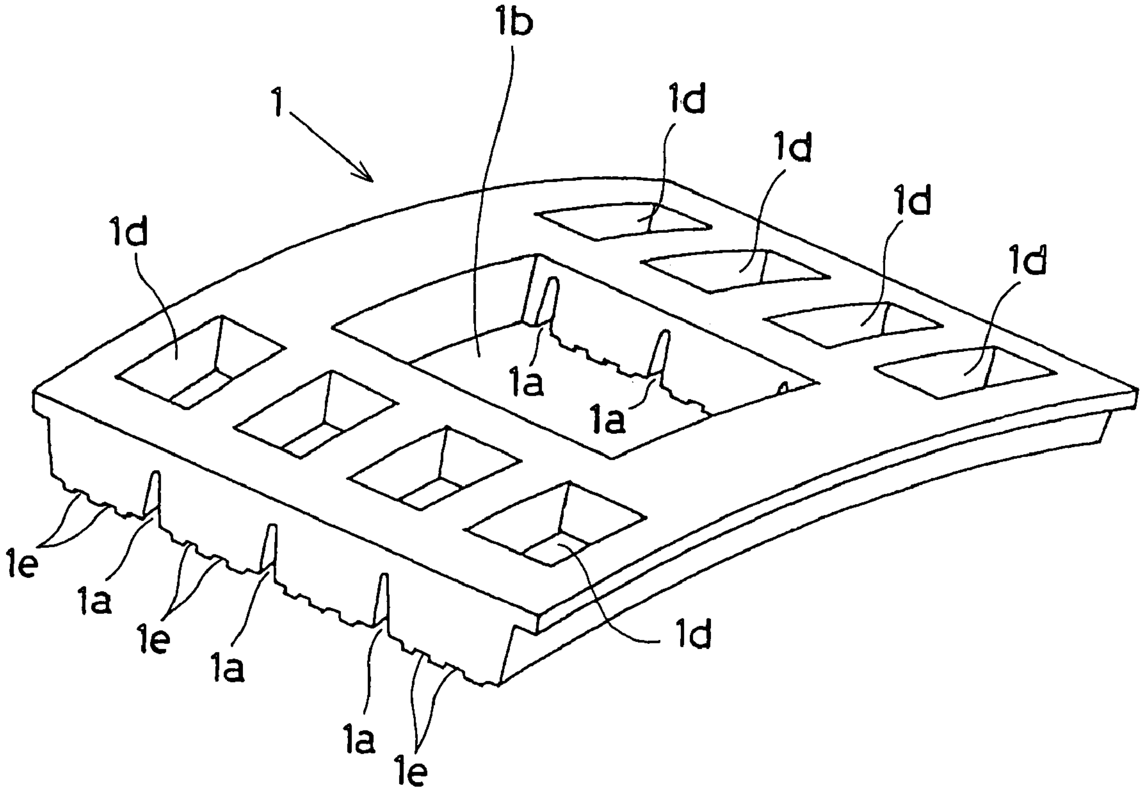
FIG. 1 is a perspective view of a rubber sealant according to a first embodiment of the invention.
Figure 2:
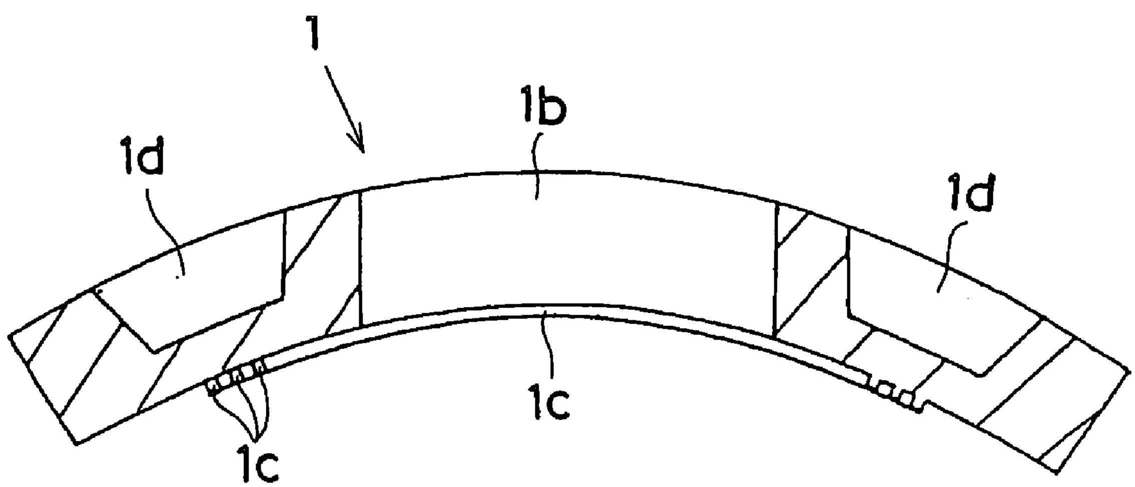
FIG. 2 is a longitudinal cross sectional view of the rubber sealant.

Referring to FIGS. 1 through 8 which show a first embodiment of the invention, a rubber sealant 1 has a rectangular contour and warped to have a radius corresponding to that of a saddle flange 2*a* provided on a lower portion of a joint duct 2 as shown in FIGS. 1 and 2. An inner surface of the rubber sealant 1 has streaks of narrow and long grooves 1*a* (e.g., 2 to 3 mm in width) with regular intervals (e.g., 3 to 8 ridges) along a main ribbed duct 3 so as to fit the grooves 1*a* to ribs 3*a* provided on the main ribbed duct 3 upon connecting the saddle flange 2*a* to the main ribbed duct 3.

Figure 3:
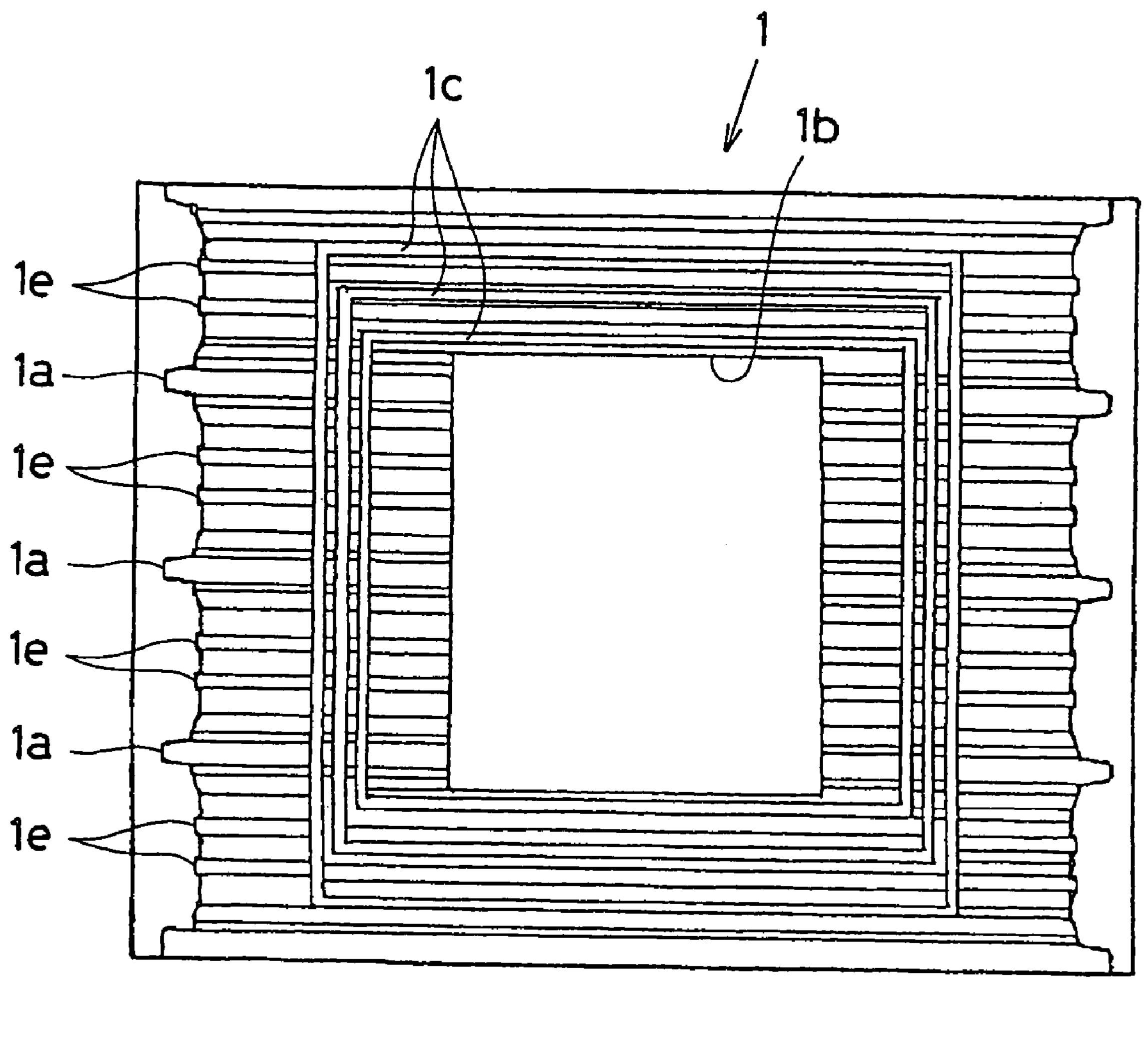
FIG. 3 is a plan view showing an inner side of the rubber sealant.
Figure 4:
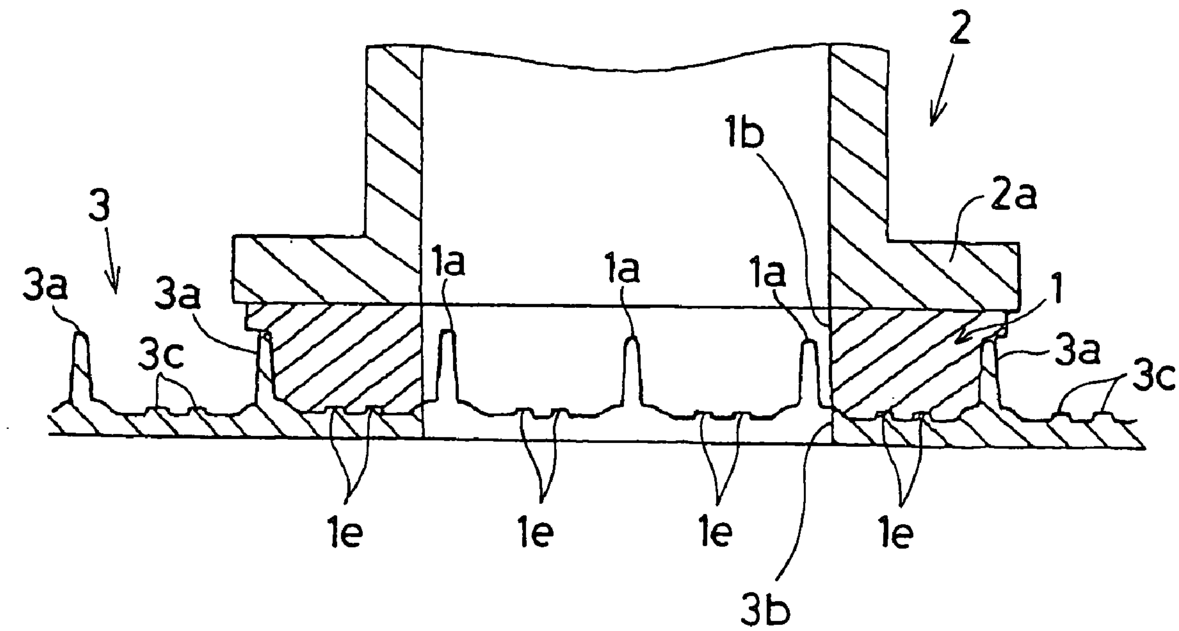
FIG. 4 is a longitudinal cross sectional view showing the manner when a branch duct is connected to a main ribbed duct.
Figure 5:
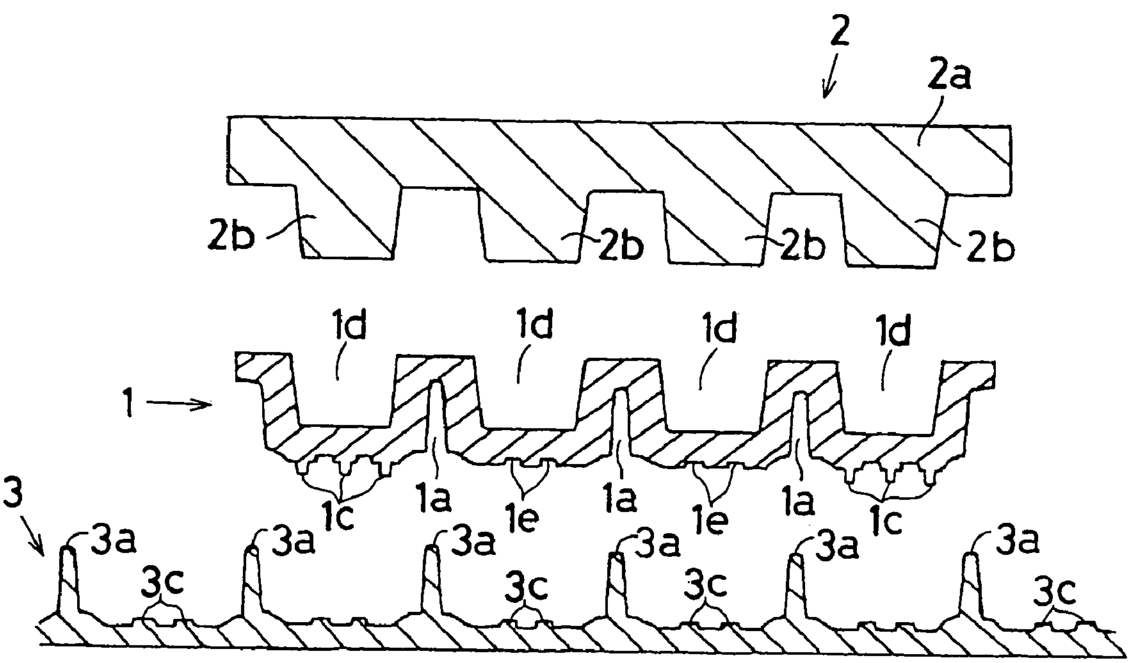
FIG. 5 is an exploded cross sectional view of the branch duct, the rubber sealant and the main ribbed duct.
Figure 6:
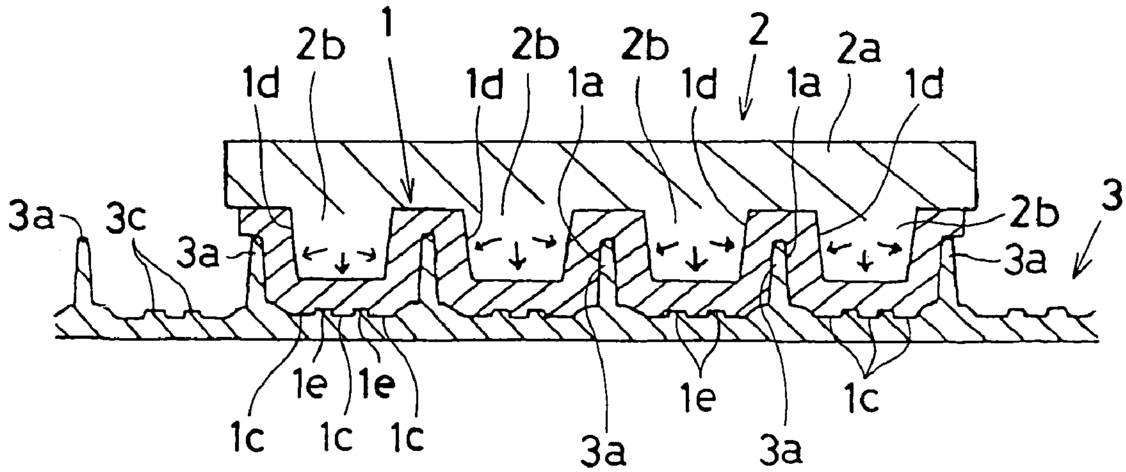
FIG. 6 is a longitudinal cross sectional view of the rubber sealant when fitting protuberances into recesses.

Provided with a central area of the rubber sealant 1, is a communication hole 1*b* in correspondence to an upper opening 3*b* provided on the main ribbed duct 3 as shown in FIG. 3. Around periphery of the communication hole 1*b*, concentrically provided are streaks of water sealing small projective rings 1*c* (e.g., three ridges each 1 to 3 mm in breadth and height). Opposite to the side in which the grooves 1*a* are provided, bottomed recesses 1*d* (e.g., four) are formed in the manner to position between. the neighboring ribs 3*a* and to surround the communication hole 1*b*.

In this instance, the recesses 1*d* are formed into a rectangular configuration, and inner surface of the recesses 1*d* is tapered to progressively increase its breadth toward an outer periphery of the recesses. The tapered recesses 1*d* serve as guides when receiving protuberances 2*b* provided on an inner surface of the saddle flange 2*a*. Depth and breadth of the recesses 1*d* are in correspondence to length and breadth of the protuberances 2*b*. In the main ribbed duct 3 shown in FIGS. 4 through 6, small ribs 3*c* are defined between the ribs 3*a*, grooves 1*e* of small depth are formed on the rubber sealant 1 in correspondence to small ribs 3*c*.

Figure 7:
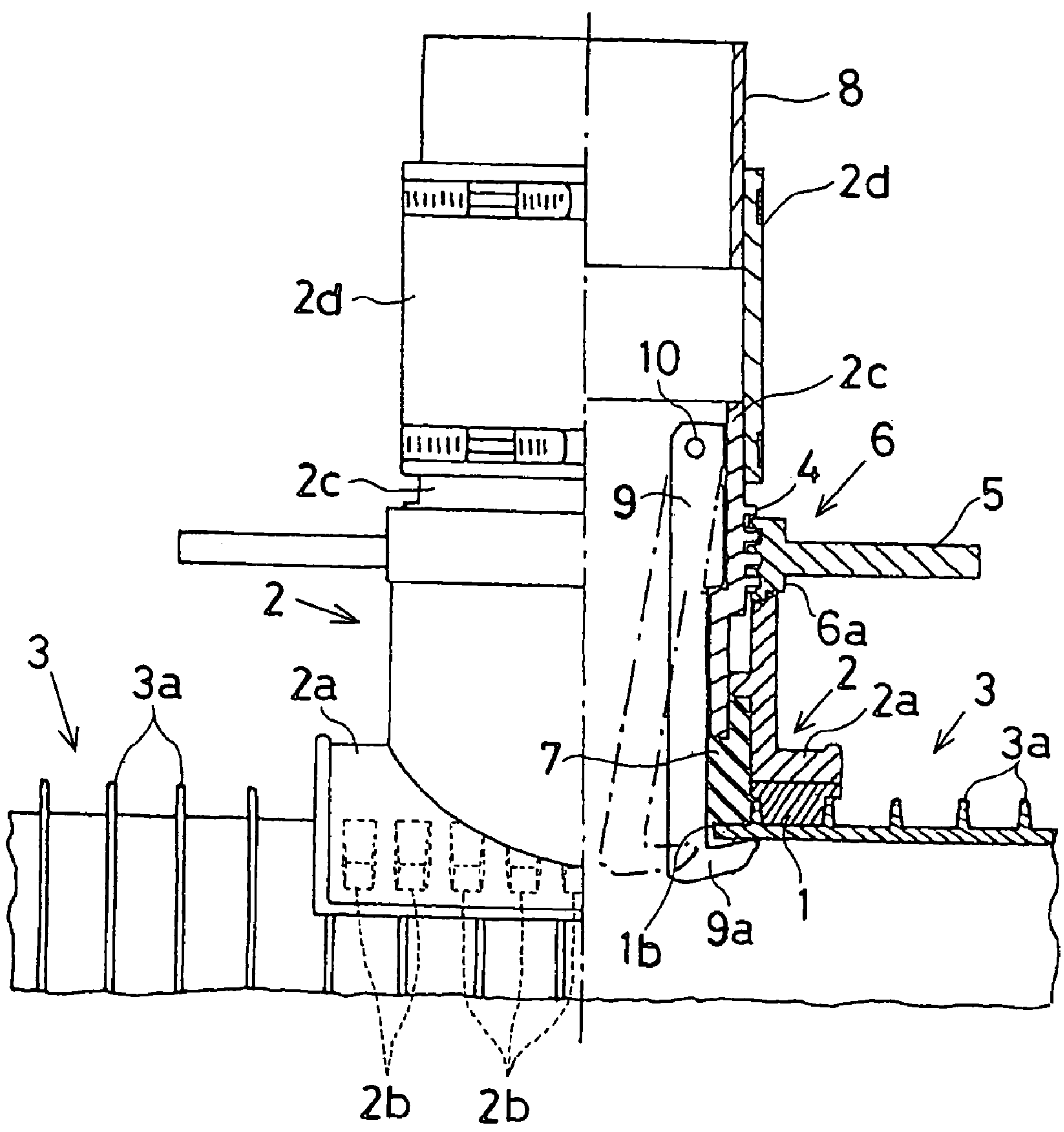
FIG. 7 is a longitudinal cross sectional view showing the manner in which the branch duct is connected to the main ribbed duct in cooperation with a pawl stopper.

As shown in FIG. 7, a branch duct 2*c* is interfit into an inner wall of the joint duct 2, and an outer surface of the branch duct 2*c* has a male thread portion 4 to which a nut ring 6 is secured by means of a handle 5. Between a lower portion of the branch duct 2*c* and an inner edge of the upper opening 3*b*, interposed is a rubber seal ring 7.

With a lower edge 6*a* of the nut ring 6 engaged against an upper end of the joint duct 3, the nut ring 6 is turned in a predetermined direction to move the branch duct c downard to press the rubber seal ring 7 so as to liquid-tightly connect the branch duct 2*c* to a periphery of the upper opening 3*b*. A securement duct 8, which introduces the domestic waste water, is connected to the branch duct 2*c* via a rubber connector 2*d*. An L-shaped pawl stopper 9 is rotationally pivoted at an upper end to an inner wall of the branch duct 2*c* by means of a pin 10. The pawl stopper 9 has a lower hook portion 9*a* which engages with the inner edge of the communication hole 1*b* to serve as a duct locking means which strengthens the connection between the branch duct 2*c* and the main ribbed duct 3.

With the structure thus far described, the main ribbed duct 3 is embedded within the ground as a sewer conduit, and the joint duct 2 is bring to the main ribbed duct 3 to connect the saddle flange 2$a$ to the periphery of the upper opening 3$b$ through the rubber sealant 1. In this instance, the grooves 1$a$ fit to the ribs 3$a$ of the main ribbed duct 3, and the water seal small projective rings 1$c$ elastically engage with an outer surface of the main ribbed duct 3. In accompany with the protuberances 2$b$ fit into the recesses 1$d$ of the rubber sealant 1, the rubber sealant 1 is uniformly pressed against the main ribbed duct 3 to elastically connect the joint duct 2 and the main ribbed duct 3.

In this instance, a length of the protuberances 2$b$ may be smaller than a depth of the recesses 1$d$, and a breadth of the protuberances 2$b$ may be somewhat greater than that of the recesses 1$d$ so as to elastically expand the recesses 1$d$ upon fitting the protuberances 2$b$ into the recesses 1$d$. With the result that the protuberances 2$b$ are forced into the recesses 1$d$ to press the rubber sealant 1 as a whole, thus enabling the workers to more uniform engagement force against the main ribbed duct 3.

Figure 8:
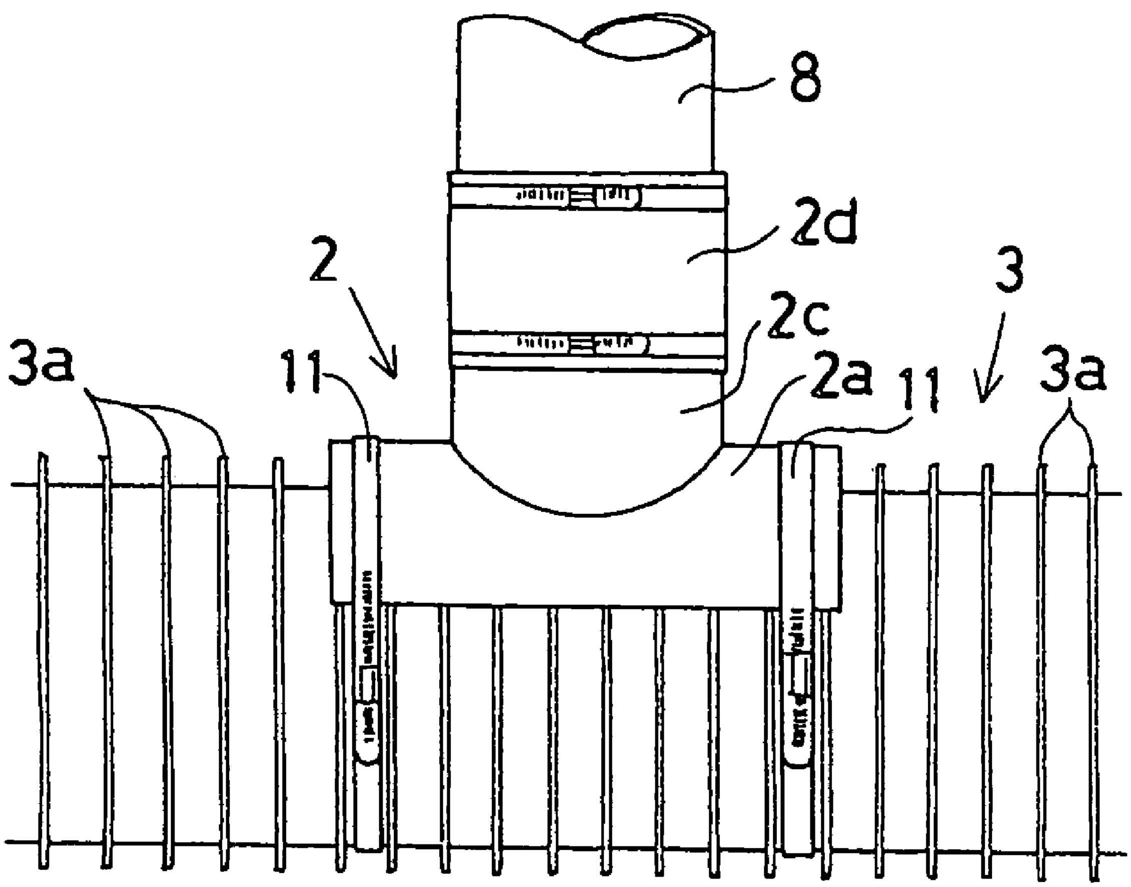
FIG. 8 is a plan view showing the manner upon connecting the branch duct to the main ribbed duct by means of a wire band.

The uniform engagement force is all the more strengthened with the use of the pawl stopper 9 which engages against the saddle flange 2$a$ (see FIG. 7), and with the use of a wire band 11 bound around the saddle flange 2$a$ and the main ribbed duct 3 (see FIG. 8). The rubber sealant 1 may be made of a water-expandable rubber by mixing an water-absorptive resin with styrene butadiene rubber and isoprene rubbner, otherwise by mixing an water-absorptive resin with chloroprene rubber. With the water-expandable rubber applied to the rubber sealant 1, the rubber sealant 1 expands when immersed in the water to significantly improve the water sealing action.

Figure 9:
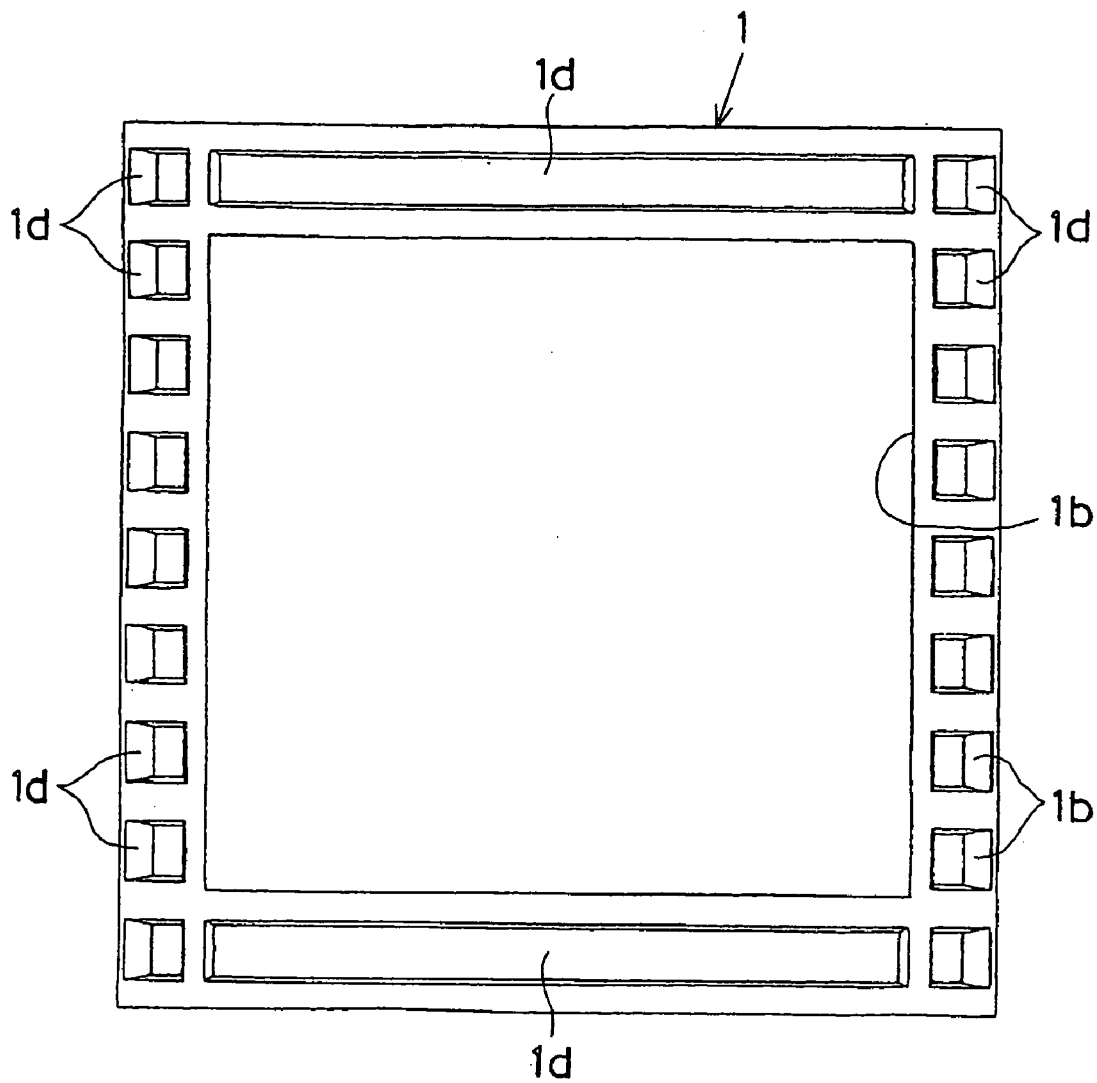
FIG. 9 is a plan view of a modification form of the rubber sealant.
Figure 10:
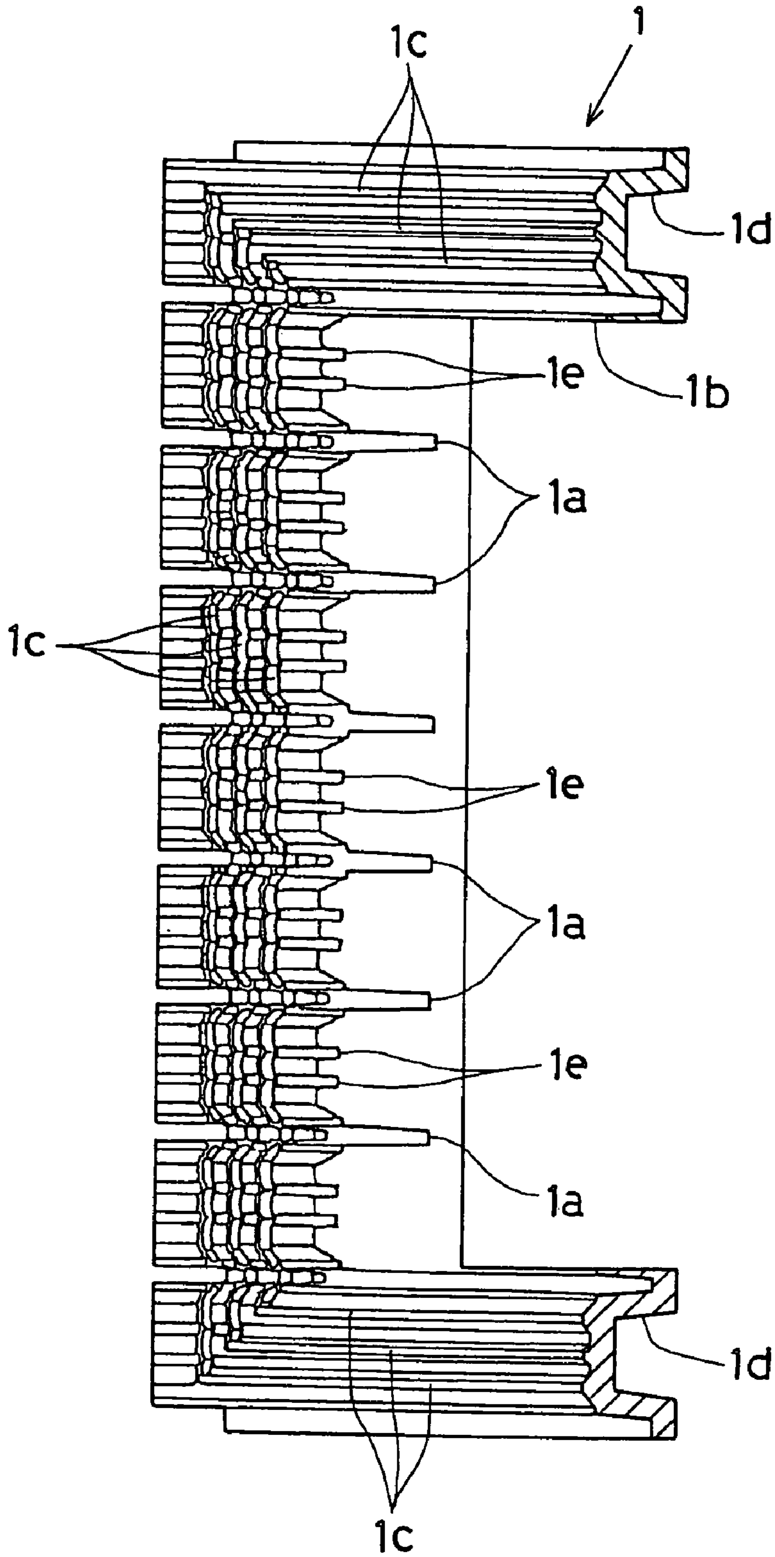
FIG. 10 is a longitudinal cross sectional view of the rubber sealant.

FIGS. 9 and 10 show a modification form of the rubber sealant 1. The reference numerals identical to FIGS. 1~8 corresponds to the reference numerals in the modification form. The rubber sealant 1 is altered at geometrical shape based on an adaptability relationship betweeen the main ribbed duct 3 and the saddle flange 2$a$. In the case of the modification form, the communication hole 1$b$ is relatively large. For this reason, the periphery of the rubber sealant 1 is defined into a frame-like configuration. Vertically opposed sides of the rubber sealant 1 is provided with the lateral recesses 1$d$, and horizontally opposed sides of the rubber sealant 1 is provided with the square recesses 1$d$ (e.g., nine in each side) in an up-and-down direction.

Figure 11:
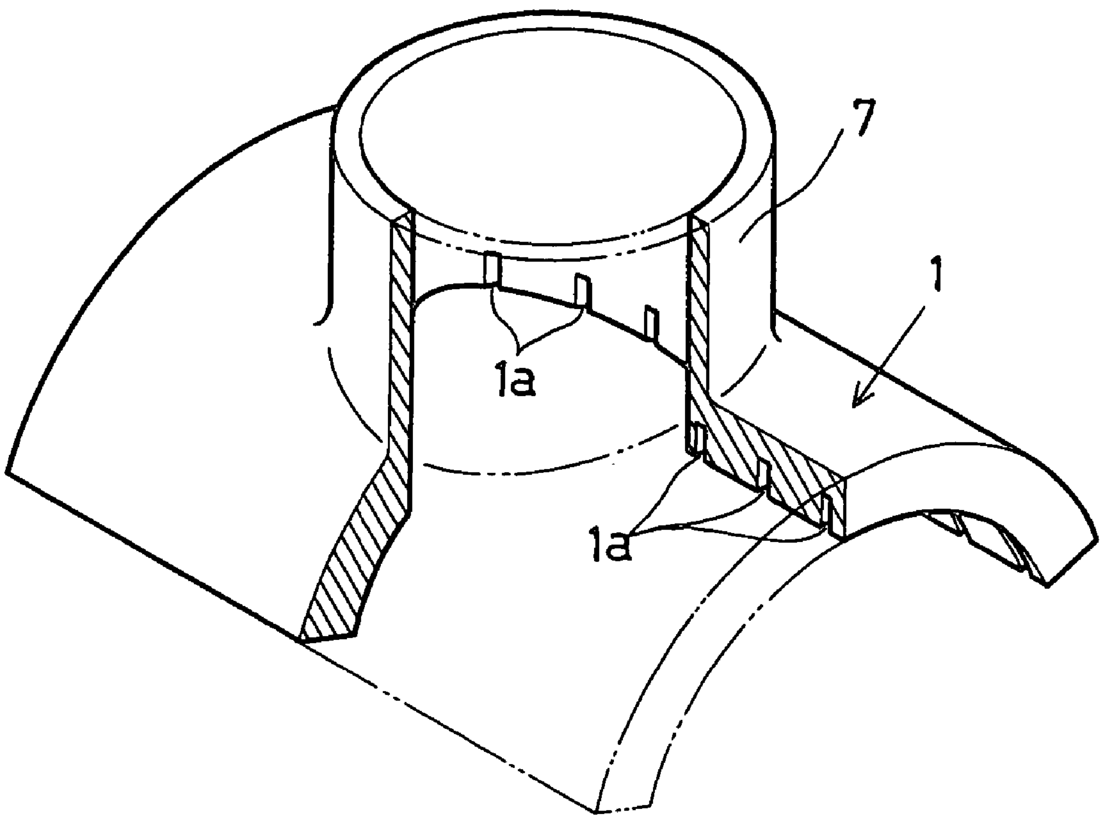
FIG. 11 is a perspective view of another modification form of the rubber sealant with which a rubber seal ring is formed in one piece.
Figure 12:
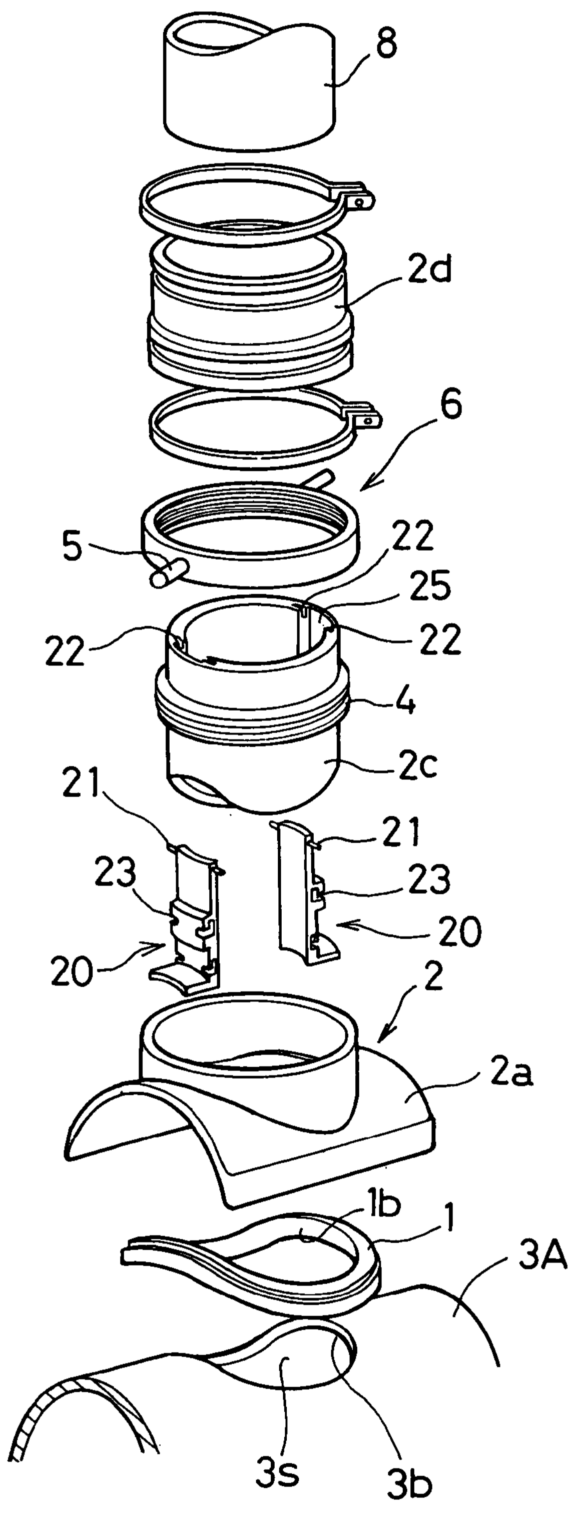
FIG. 12 is an exploded perspective view mainly showing the branch duct, the rubber sealant and a main duct according to a second embodiment of the invention.
Figure 13:
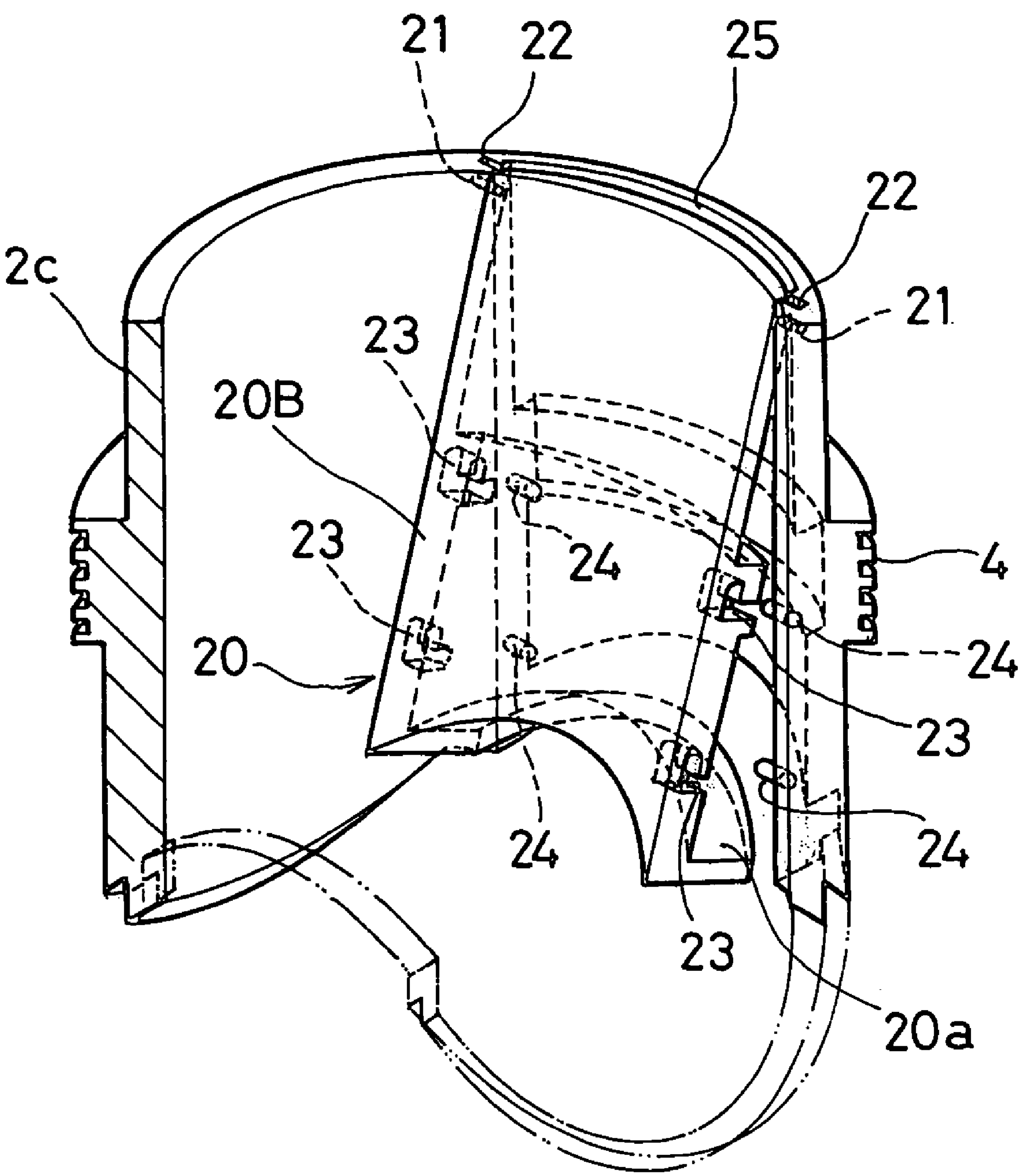
FIG. 13 is a perspective view of the branch duct but partially broken.

FIG. 11 shows another modification form in which the rubber seal ring 7 of FIG. 7 is formed in one piece with the rubber sealant 1. This reduces the number of component parts to save the manufacturing cost, while at the same time, becoming facile to handle the rubber sealant 1 to enable the workers to quickly connecting the branch duct 2$c$ to the main ribbed duct 3. Shapes of the rib-fitting grooves 1$a$ in FIG. 11 are different from those in FIG. 1 and the recesses 1$d$ are omitted only for the purpose of convenience.

The ribs 3$a$ may be tapered off toward a front end of the ribs 3$a$, and the rib-fitting grooves 1$a$ may be flared toward an open end of the rib-fitting grooves 1$a$. This makes it possible to readily locate the ribs 3$a$ in the rib-fitting grooves 1$a$, and tightly engage the ribs 3$a$ with the rib-fitting grooves 1$a$ to secure an elastically tight engagement between the ribs 3$a$ and the rib-fitting grooves 1$a$. It is to be noted that the recesses 1$d$ may be formed substantially into any geometrical shape such as semi-circular, circular, triangular, square or polygonal configuration.

FIGS. 12 through 15 show a second embodiment of the invention in which the rubber sealant 1 is simply formed into an annular ring configuration to be attached to a ribless main duct 3A, and a pair of plastic stopper plates 20 is provided to position in diametrically opposed location.

Figure 14:
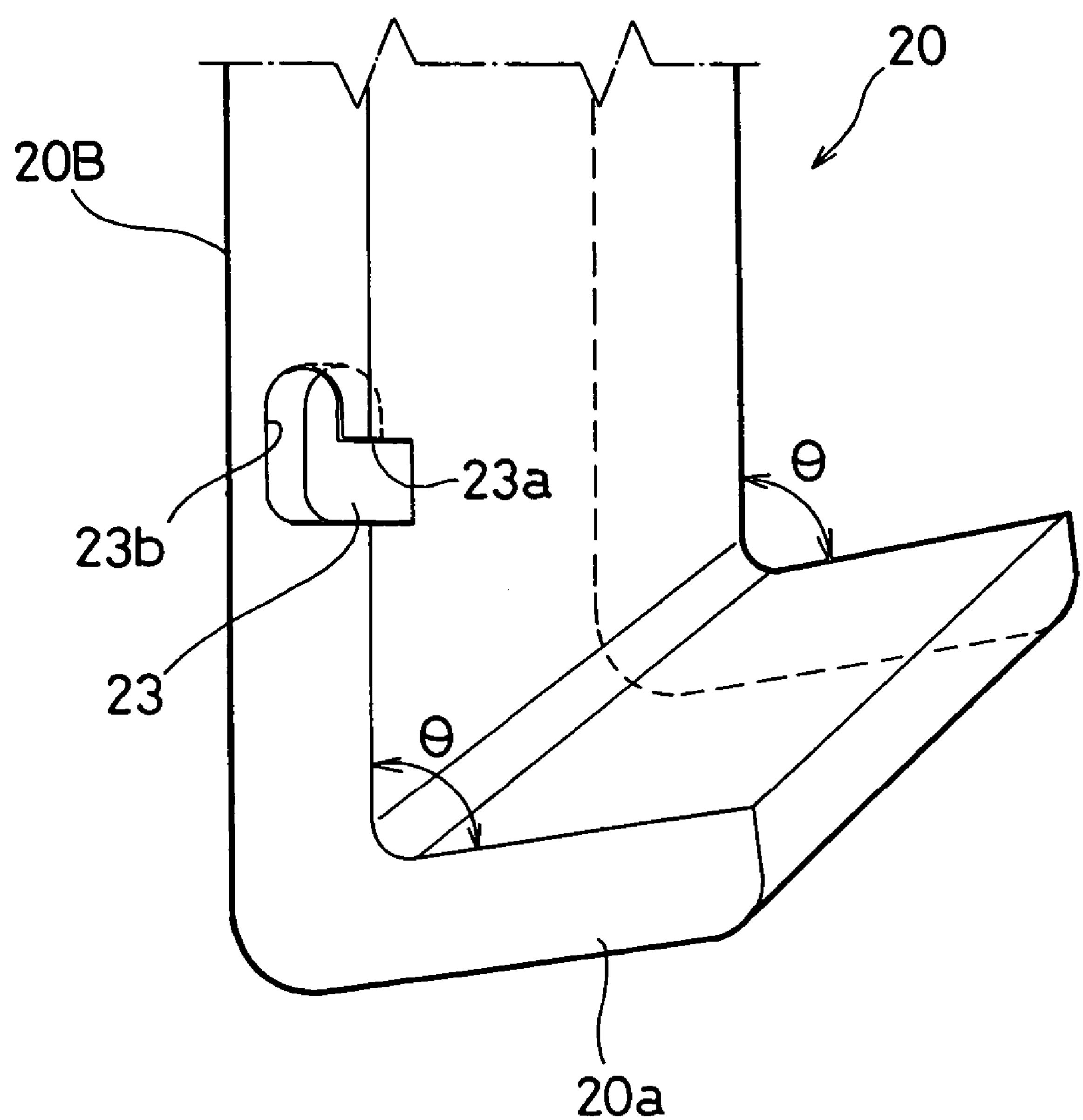
FIG. 14 is a side elevational view of a stopper plate but partially broken.

The stopper plate 20 has substantially an L-shaped cross section so that the stopper plate 20 is located at a vertical recess 25 provided on an inner wall of the branch duct 2$c$. A hook portion 20$a$ forms an acute angle ($\theta$) (e. g., 80 degrees among an angular range of $0<\theta\leqq 85°$) against a vertical wall 20B of the stopper plate 20 as shown in FIG. 14. A pin 21 is provided on both upper elevational sides of the stopper plate 20 in correspondence to a groove 22 formed on an upper open end of the branch duct 2$c$ as a pin-and-groove combination. An L-shaped cavity 23 is provided on both sides of the vertical wall 20B of the stopper plate 20 in correspondence to a pin 24 formed on the inner wall of the branch duct 2$c$. The cavity 23 is paired at right and left side of the vertical wall 20B in two tiers in up-and-down direction.

The L-shaped cavity 23 has a lateral portion 23$a$ and a vertical portion 23$b$. The lateral portion 23$a$ extends along a thickness direction of the vertical wall 20B of the stopper plate 20, while the vertical portion 23$b$ extends along a lengthwise direction of the vertical wall 20B.

The stopper plate 20 is adapted to vertically and rotationally move at the groove 22 when fitting the pin 21 into the groove 22 so that the pin 24 is admitted through a lateral portion 23$a$ into the cavity 23.

Figure 15:
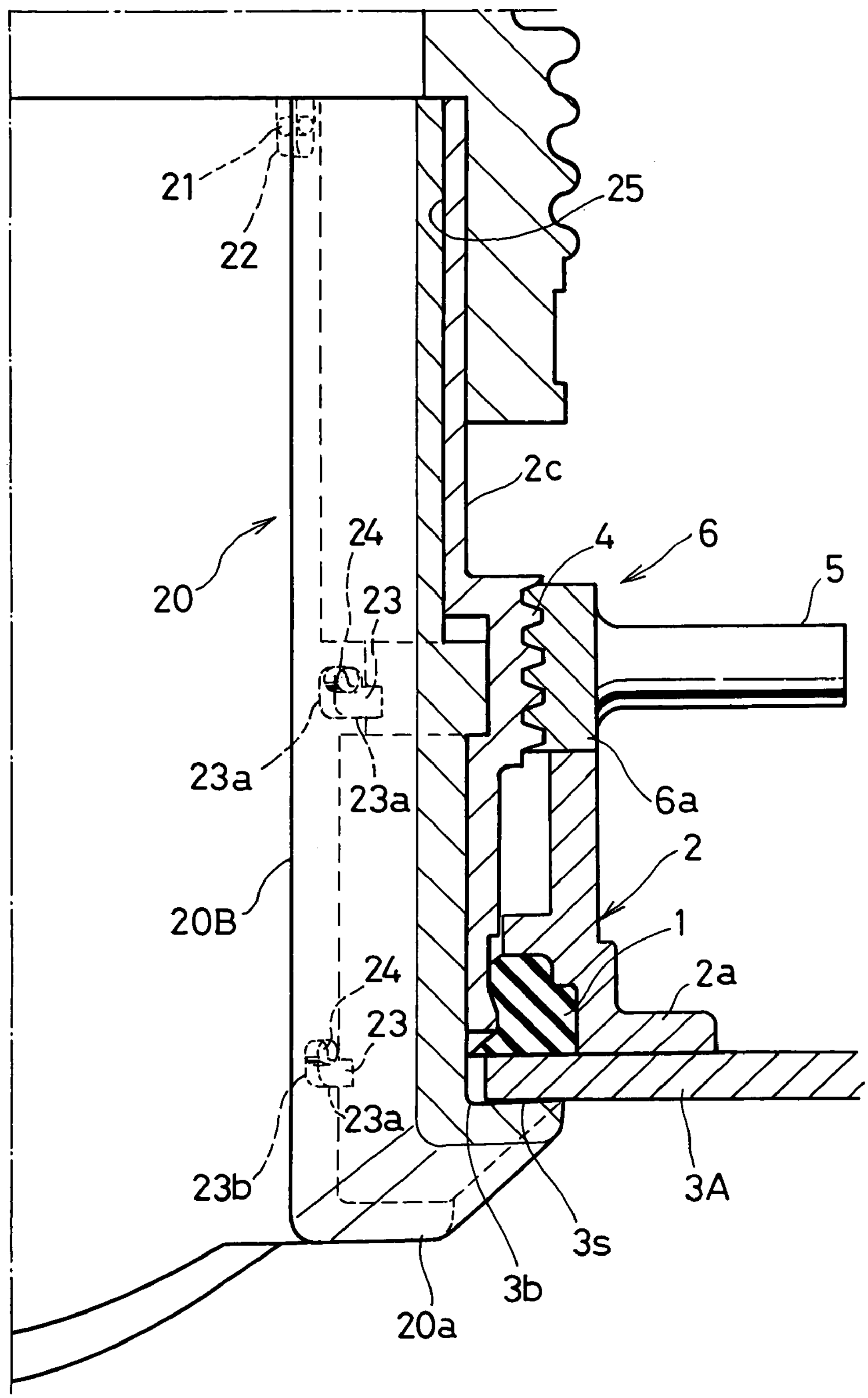
FIG. 15 is a longitudinal cross sectional view of a stopper plate which engages with a main duct.

Upon connecting the branch duct 2$c$ to the main duct 3A through the annular rubber sealant 1 as shown in FIG. 15, the pin 21 located in the groove 22 is slightly moved downward so that the vertical portion 23$b$ embraces the pin 24 which is previously admitted into the lateral portion 23$a$ of the cavity 23 so as to prevent the stopper plate 20 from disengaging inadvertently from the inner wall of the branch duct 2$c$.

In accompany with rotationally moving the stopper plate 20, the stopper plate 20 tightly engages the hook portion 20$a$ with an inner edge 3$s$ located around the upper opening 3$b$ of the main duct 3A in combination with an elastic deformation of the hook portion 20$a$. At this time, the hook portion 20$a$ elastically expands outward to strengthen an engagement against the inner edge 3$s$ circumferentially located around the upper opening 3$b$ of the main duct 3A.

Figure 16:
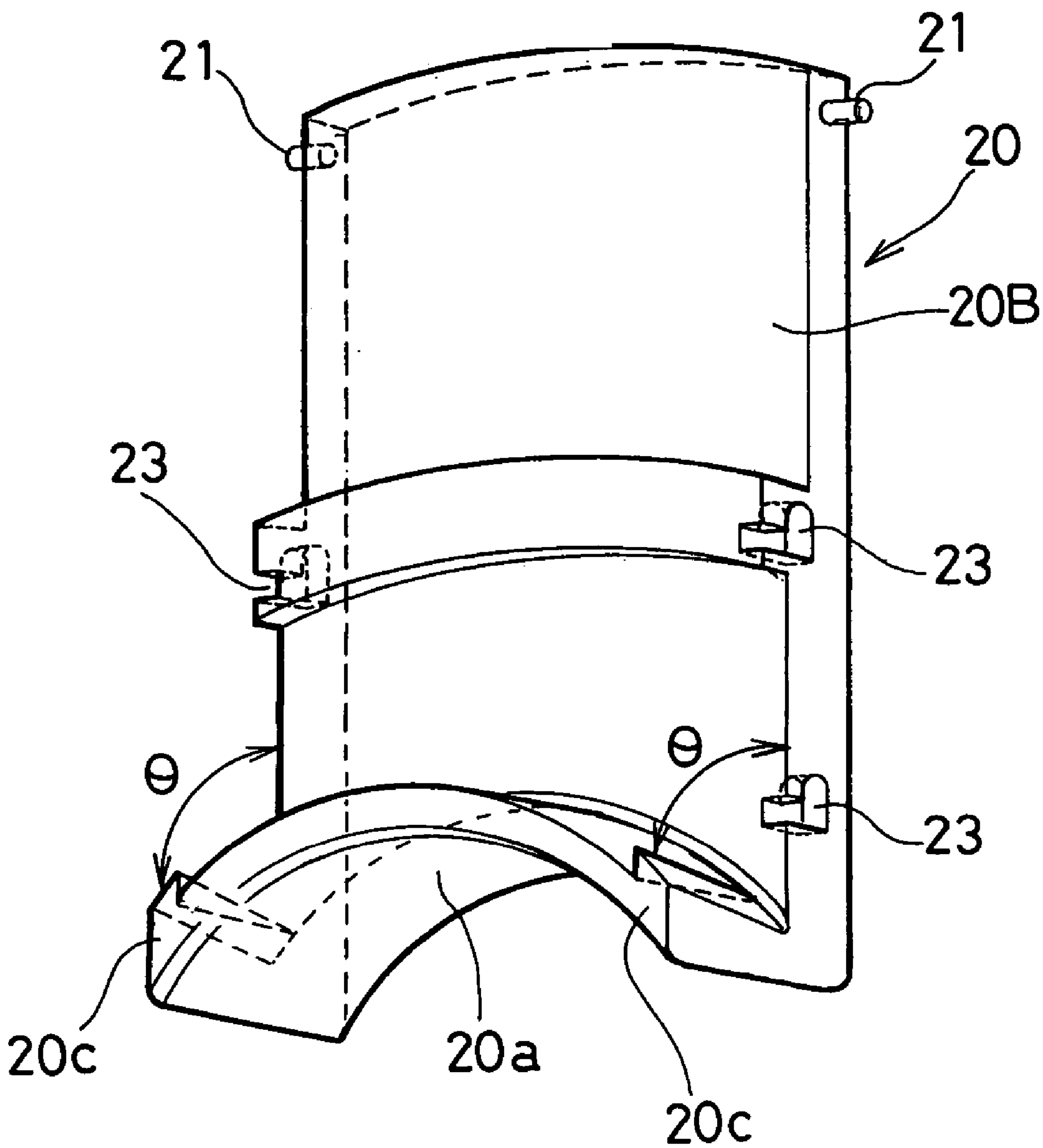
FIG. 16 is a perspective view of a stopper plate according to a third embodiment of the invention.

FIG. 16 shows a third embodiment of the invention in which a right-angled triangle piece 20$c$ is provided at both sides of the-hook portion 20$a$. A hypotenuse portion of the right-angled triangle piece 20$c$ forms an acute angle ($0<\theta\leqq 85°$) against the vertical wall 20B of the stopper plate 20. At the time of engaging the hook portion 20$a$ with the inner edge 3$s$ located around the upper opening 3$b$ of the main duct 3A, the hook portion 20$a$ elastically deforms to tightly engage its hypotenuse portion with the inner edge 3$s$ around the upper opening 3$b$ for positively securing it against removal in the same manner as described at the second embodiment in FIG. 15.

Figure 17:
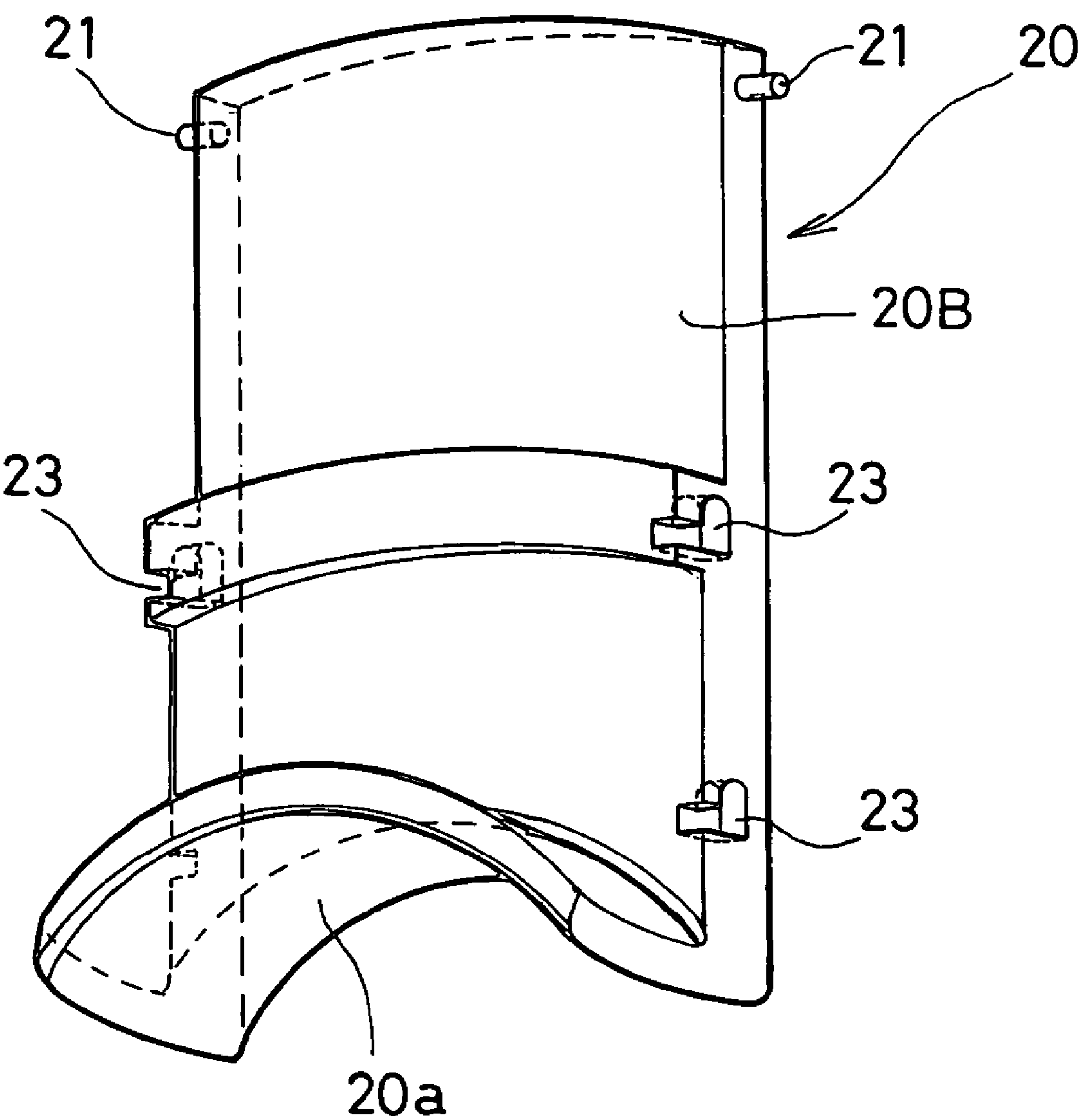
FIG. 17 is a perspective view of a stopper plate according to a fourth embodiment of the invention.
Figure 18:
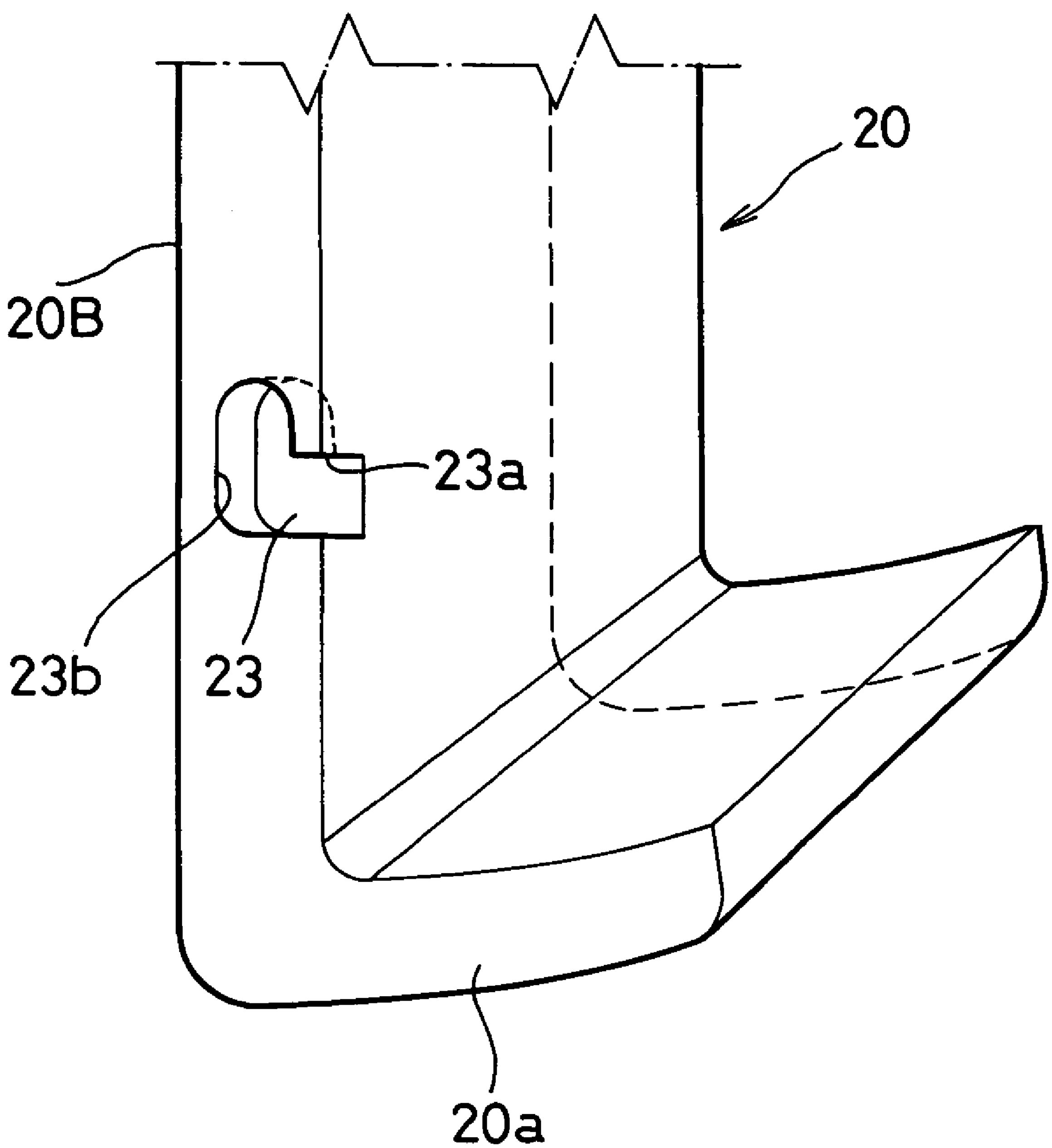
FIG. 18 is a side elevational view of the stopper plate but partially broken.

FIGS. 17 and 18 show a fourth embodiment of the invention in which the hook portion 20$a$ is slightly warped downward to define a curved plane. A basal portion of the curved plane forms either an acute angle ($0<\theta\leqq 85°$) or a substantial right angle against the vertical wall 20B of the stopper plate 20.

Figure 19:
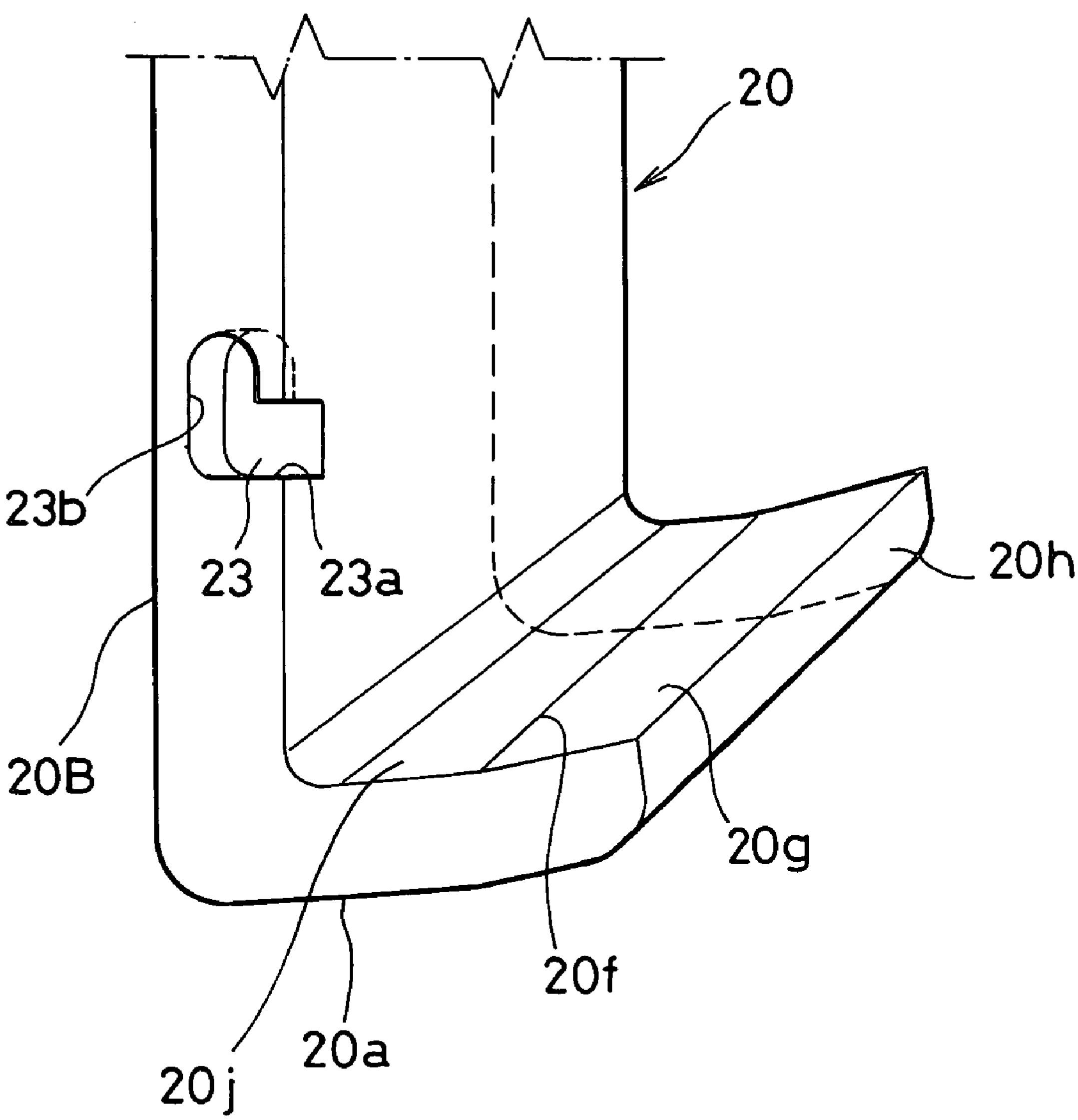
FIG. 19 is a side elevational view of a stopper plate according to a fifth embodiment of the invention.

FIG. 19 shows a fifth embodiment of the invention in which the hook portion 20$a$ has a stepped portion 20$f$ along a breadth direction to define a slantwise plane 20$g$ consecutively formed from a base plane 20$j$. The slantwise plane 20$g$ is successively elevated upward toward a tip end 20$h$ of the hook portion 20$a$. At the time of connecting the branch duct 2$c$ to the main duct 3A in the same manner as described at the second embodiment in FIG. 15, the hook portion 20$a$ engages the slantwise plane 20$g$ with the inner edge 3$s$ around the upper opening 3*b* so as to strengthen the engagement action. In this instance, the base plane 20*j* forms either an acute angle (0<θ≦85°) or a substantial right angle against the vertical wall 20B of the stopper plate 20.

It is to be noted that a pair of the L-shaped cavities 23 is not confined to two areas in two tiers, but a pair of the L-shaped cavities 23 may be placed on a single one area or three more areas. The cavities 23 may be provided on the inner wall of the branch duct 2*c*, and the pin 24 may be provided on the vertical wall 20B of the stopper plate 20. It is to be appreciated that a wire band may be provided to tightly bind the saddle flange 2*a* to the main duct 3A.

What is claimed is:

1. A duct connection assemble comprising:

a joint duct having a branch duct and a saddle flange formed on a lower portion of said branch duct;

a main ribbed duct having an upper side opening and a plurality of ribs formed around said upper side opening;

a rubber sealant having streaks of rib-fitting grooves to be fit into said ribs, and having a communication hole which is to be communicated with said upper side opening;

a plurality of recesses provided on an upper surface of said rubber sealant to be positioned between said rib-fitting grooves;

a plurality of protuberances provided on a lower surface of said saddle flange to be fit into said recesses;

a plurality of water sealing small projective rings provided on a lower surface of said rubber sealant in correspondence to said recesses to concentrically surround said communication hole;

whereby upon connecting said saddle flange of said joint duct to said main ribbed duct through said communication hole, said rubber sealant is interposed between said saddle flange and a circumferential area of said communication hole so that said protuberances uniformly press said rubber sealant substantially through said recesses to tightly engage said saddle flange against an outer surface of said main ribbed duct through said rib-fitting grooves and said water sealing small projective rings.

2. The duct connection assemble according to claim 1, wherein a rubber seal ring is provided to liquid-tightly seal between said saddle flange and a circumferential area of said communication hole, said rubber seal ring being formed in one piece with said rubber sealant.

3. The duct connection assemble according to claims 1 and 2, wherein a pawl stopper is rotationally supported on an inner wall of said branch duct, said pawl stopper having a hook portion which engages with an inner edge of said communication hole.

4. The duct connection assemble according to claim 1, wherein said rubber sealant is made of an water-expandable rubber.

5. The duct connection assemble according to claim 1, wherein an inner surface of said recesses of said rubber sealant is tapered to progressively increases a breadth toward an exterior portion of said recesses.

6. The duct connection assemble according to claim 1, wherein a breadth of said protuberances is slightly greater than that of said recesses so that said protuberances elastically expand said recesses when fitting said protuberances into said recesses.

7. The duct connection assemble according to claim 4, wherein said water-expandable rubber is formed by mixing an water-absorptive resin with styrene butadiene rubber and isoprene rubbner, otherwise by mixing an water-absorptive resin with chloroprene rubber.

8. The duct connection assemble according to claim 1, wherein said rubber sealant is in the form of rectangular frame which has a rectangular communication hole, an outer peripheral area of said rubber sealant having said recesses.

9. The duct connection assemble according to claim 1, wherein said rib-fitting grooves are 2 to 3 mm in breadth, and said water sealing small projective rings are 1 to 3 mm in both breadth and height.

10. The duct connection assemble according to claim 1, wherein a plurality of small ribs are formed between said ribs, said rib-fitting grooves having narrow and deep grooves fit into said ribs and grooves of small depth fit into said small ribs.

11. The duct connection assemble according to claim 1, wherein a wire band is provided to tightly bind said saddle flange to said main ribbed duct.

12. A duct connection assemble comprising:

a branch duct connected to a joint duct which has a saddle flange formed on a lower portion of said joint duct;

a main duct having an upper opening in correspondence to said joint duct;

a rubber sealant having a communication hole which is to be in communication with said upper opening of said main duct;

a plastic stopper plate having substantially an L-shaped cross section and rotationally supported on an inner wall of said branch duct, said stopper plate having a hook portion which engages through said rubber sealant with an inner edge located around said upper opening of said main duct;

said stopper plate having:

(a) said hook portion forming an acute angle against a vertical wall of said stopper plate;

(b) an L-shaped cavity substantially formed on either a vertical wall of said stopper plate or an inner wall of said branch duct, said cavity having a lateral portion and a vertical portion;

(c) a pin secured to either said vertical wall of said stopper plate or said inner wall of said branch duct;

(d) said vertical wall being vertically movably supported by a pin-and-groove combination; and (e) said pin being admitted through said lateral portion and moved into said vertical portion of said L-shaped cavity when said stopper plate is rotationally and vertically moved through said pin-and-groove combination so as to engage said hook portion with said inner edge located around said upper opening in accompany with an elastic deformation of said hook portion.

13. A duct connection assemble comprising:

a branch duct connected to a joint duct which has a saddle flange formed on a lower portion of said joint duct;

a main duct having an upper opening in correspondence to said joint duct;

a rubber sealant having a communication hole which is to be in communication with said upper opening of said main duct;

a plastic stopper plate having substantially an L-shaped cross section and rotationally supported on an inner wall of said branch duct, said stopper plate having a hook portion which engages through said rubber sealant with an inner edge located around said upper opening of said main duct;

said stopper plate having:

(a) said hook portion warped downward to define a curved plane;

(b) an L-shaped cavity substantially formed on either a vertical wall of said stopper plate or an inner wall of said branch duct, said cavity having a lateral portion and a vertical portion;

(c) a pin secured to either said vertical wall of said stopper plate or said inner wall of said branch duct;

(d) said vertical wall being vertically movably supported by a pin-and-groove combination; and (e) said pin being admitted through said lateral portion and moved into said vertical portion of said L-shaped cavity when said stopper plate is rotationally and vertically moved through said pin-and-groove combination so as to engage said hook portion with said inner edge located around said upper opening in accompany with an elastic deformation of said hook portion.

14. A duct connection assemble comprising:

a branch duct connected to a joint duct which has a saddle flange formed on a lower portion of said joint duct;

a main duct having an upper opening in correspondence to said joint duct;

a rubber sealant having a communication hole which is to be in communication with said upper opening of said main duct;

a plastic stopper plate having substantially an L-shaped cross section and rotationally supported on an inner wall of said branch duct, said stopper plate having a hook portion which engages through said rubber sealant with an inner edge located around said upper opening of said main duct;

said stopper plate having:

(a) said hook portion having a stepped portion to define a slantwise plane successively elevated toward an tip end of said hook portion;

(b) an L-shaped cavity substantially formed on either an vertical wall of said stopper plate or an inner wall of said branch duct, said cavity having a lateral portion a vertical portion;

(c) a pin secured to either said vertical wall of said stopper plate or said inner wall of said branch duct;

(d) said vertical wall being vertically movably supported by a pin-and-groove combination; and (e) said pin being admitted through said lateral portion and moved into said vertical portion of said L-shaped cavity when said stopper plate is rotationally and vertically moved through said pin-and-groove combination so as to engage said hook portion with said inner edge located around said upper opening in accompany with an elastic deformation of said hook portion.

15. The duct connection assemble according to claim 12, wherein a right-angled triangle piece is provided on both sides of said hook portion, said right-angled triangle piece forming an acute angle against a vertical wall of said stopper plate.

16. The duct connection assemble according to claim 12, wherein said rubber sealant is made of an water-expandable rubber.

17. The duct connection assemble according to claim 16, wherein said water-expandable rubber is formed by mixing an water-absorptive resin with styrene butadiene rubber and isoprene rubbner, otherwise by mixing an water-absorptive resin with chloroprene rubber.

18. The duct connection assemble according to claim 12, wherein a wire band is provided to tightly bind said saddle flange to said main duct.

* * * * *